United States Patent [19]

Hackbarth

[11] 4,413,865
[45] Nov. 8, 1983

[54] MARINE PROPULSION DEVICE INCLUDING BEARING HEAD RETENTION MEANS

[75] Inventor: Eugene R. Hackbarth, Kenosha, Wis.

[73] Assignee: Outboard Marine Corporation, Waukegan, Ill.

[21] Appl. No.: 267,260

[22] Filed: May 26, 1981

[51] Int. Cl.³ ............................................. F16C 19/26
[52] U.S. Cl. .................................. 308/207 R; 74/417
[58] Field of Search ............... 308/207 R, 236, 189 R, 308/207 A, 189 A, 210, 211; 74/417

[56] References Cited

U.S. PATENT DOCUMENTS

| 1,751,453 | 3/1930 | Beemer. | |
|---|---|---|---|
| 2,136,125 | 11/1938 | Delaval-Crow | 308/236 |
| 2,226,511 | 12/1940 | Hollerith | 301/37 |
| 2,502,108 | 3/1950 | Taylor | 212/8 |
| 2,772,929 | 12/1956 | Eastman | 308/236 |
| 2,837,382 | 6/1958 | Schaefer | 308/236 |
| 3,930,695 | 1/1976 | Forrest | 308/236 |
| 3,934,952 | 1/1976 | Gardner | 308/36.1 |
| 3,937,093 | 2/1976 | Johnson et al. | 74/417 |
| 4,138,168 | 2/1979 | Herlitzek | 308/236 |

*Primary Examiner*—Lenard A. Footland
*Attorney, Agent, or Firm*—Michael, Best & Friedrich

[57] ABSTRACT

A lower unit for a marine propulsion device includes a drive shaft housing having a lower end, a gearcase housing connected to the lower end of the drive shaft housing and having an interior wall defining an elongated cavity, the interior wall including a first surface portion transverse to the longitudinal axis of the elongated cavity and a second surface portion transverse to the longitudinal axis and spaced circumferentially from the first surface portion. A propeller shaft is located in and extends axially through the gearcase housing cavity, and a propeller is supported on the propeller shaft. A hollow bearing carrier member encircles the propeller shaft for rotatably supporting the propeller shaft inside the gearcase housing. The bearing carrier member is supported by the interior wall of the gearcase housing and carries a bearing rotatably engaging the propeller shaft. A pair of anchoring members are also provided for anchoring the bearing carrier member to the gearcase housing, one of the anchoring members including a radially outer portion engageable with the first surface portion and the other of the anchoring members including a radially outer portion engageable with the second surface portion. Bolts are provided for forcing second portions of the anchoring members toward the bearing carrier member and for causing engagement of the radially outer portions against the surface portions of the gearcase housing.

11 Claims, 6 Drawing Figures

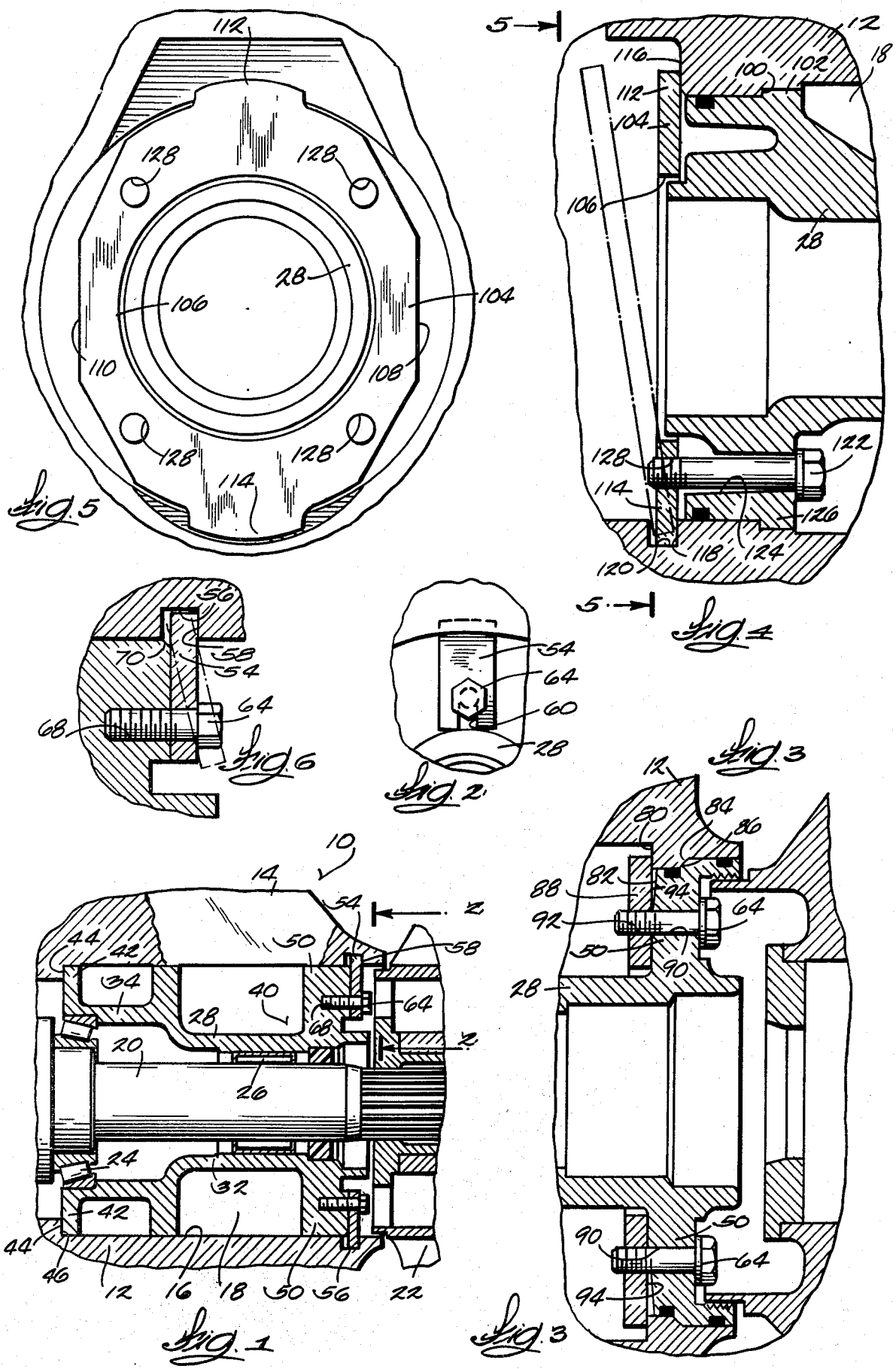

MARINE PROPULSION DEVICE INCLUDING BEARING HEAD RETENTION MEANS

FIELD OF THE INVENTION

This invention relates to marine propulsion devices such as outboard motors and stern drive units, and more particularly, to lower units for marine propulsion devices.

BACKGROUND PRIOR ART

Lower units for marine propulsion devices commonly include a drive shaft which is rotatably supported in a drive shaft housing and which drives a propeller through a gearing arrangement mounted in a gearcase housing connected to the lower end of the drive shaft housing. A propeller shaft is rotatably supported in one or more bearings carried by a bearing carrier member supported from and anchored to the interior of the gearcase housing.

One prior art arrangement for supporting and anchoring the bearing carrier member in the gearcase housing is illustrated in the Johnson et al. U.S. Pat. No. 3,937,093, issued Feb. 10, 1976.

For reference to other prior art means for securing a member interiorly of a housing, attention is directed to the Beemer U.S. Pat. No. 1,751,453, issued Mar. 18, 1930; the Okner et al. U.S. Pat. No. 2,052,108, issued Aug. 25, 1936; the Delaval-Crow U.S. Pat. No. 2,136,125, issued Nov. 8, 1938; and the Hollerith U.S. Pat. No. 2,226,511, issued Dec. 24, 1940.

Attention is also directed to the Eastman U.S. Pat. No. 2,772,929, issued Dec. 4, 1956; the Schaefer U.S. Pat. No. 2,837,382, issued June 3, 1958; the Forrest U.S. Pat. No. 3,930,695, issued Jan. 6, 1976; the Gardner U.S. Pat. No. 3,934,952, issued Jan. 27, 1976; and the Herlitzek U.S. Pat. No. 4,138,168, issued Feb. 6, 1979.

SUMMARY OF THE INVENTION

The present invention includes a lower unit for a marine propulsion device including a drive shaft housing having a lower end, a gearcase housing connected to the lower end of the drive shaft housing and having an interior wall defining an elongated cavity having a longitudinal axis. The interior wall includes a first surface portion transverse to the longitudinal axis of the elongated cavity, and a second surface portion transverse to the longitudinal axis and spaced circumferentially from the first surface portion. A propeller shaft is located in and extends axially through the gearcase housing cavity, and a propeller is supported on the propeller shaft. Means are also provided for rotatably supporting the propeller shaft inside the gearcase housing, this means including a hollow bearing carrier member which is in encircling relation with the propeller shaft, the bearing carrier member being supported from the interior wall of the gearcase housing and carrying a bearing which rotatably engages the propeller shaft. Means are also provided for anchoring the bearing carrier member to the gearcase housing, the means for anchoring including a pair of anchoring members, one of the anchoring members including a radially outer portion engageable with the first surface portion of the interior wall, and the other of the anchoring members engageable with the second surface portion. Means are further provided for forcing a second portion of the one of the anchoring members toward the bearing carrier member and for causing engagement of the radially outer portion of that anchoring member against the first surface portion, and for forcing a second portion of the other of the anchoring members toward the bearing carrier member and for causing engagement of the radially outer portion thereof against the second surface portion.

The invention also includes a lower unit for a marine propulsion device including a drive shaft housing having a lower end, a gearcase housing connected to the lower end of the drive shaft housing and having an interior wall defining an elongated cavity having a longitudinal axis. The interior wall includes a recess having a surface portion perpendicular to the longitudinal axis of the elongated cavity. A propeller shaft is located in and extends axially through the gearcase housing cavity. A propeller is supported on the propeller shaft. Means are also provided for rotatably supporting the propeller shaft inside the gearcase housing, this means including a hollow bearing carrier member which encircles the propeller shaft. The bearing carrier member is supported by the interior wall of the gearcase housing, and carries a bearing rotatably engaging the propeller shaft. Means are also provided for anchoring the bearing carrier member to the gearcase housing, the means for anchoring including an anchoring member having a first portion which can be slideably inserted into the recess and means for forcing a second portion of the anchoring member toward the bearing carrier member and for causing engagement of the first portion of the anchoring member against the surface portion.

In one embodiment of the invention the anchoring member is positioned at an oblique angle with respect to the longitudinal axis when the first portion is slideably inserted into the recess, and the anchoring member is pivoted to a position perpendicular to the longitudinal axis when the second portion is forced toward the bearing carrier.

In one embodiment of the invention the anchoring element includes a bore therethrough and the means for forcing includes a bolt extending through the anchoring element and threadably housed in a bore in the bearing carrier member.

In one embodiment of the invention the bearing carrier member includes a rear face facing the propeller, the interior wall includes a pair of recesses on opposite sides of the cavity, and the means for anchoring includes a pair of rigid anchoring members, one of the anchoring members having an end slidably insertable into one of the recesses and another of the anchoring members having an end slidably insertable into another of the recesses. Additionally, the means for forcing includes a first bolt for forcing one of the anchoring members against the rear face of the bearing carrier member and a second bolt for forcing the other of the anchoring members against the rear face of the bearing carrier member.

The invention also includes a lower unit for a marine propulsion device comprising a drive shaft housing having a lower end, a gearcase housing connected to the lower end of the drive shaft housing and having an interior wall defining an elongated cavity having a longitudinal axis, a forward end, and a rearward end. The interior wall also includes a shoulder having a surface portion transverse to the longitudinal axis of the elongated cavity, the surface portion being adjacent the rearward end of the elongated cavity and facing the forward end of the elongated cavity. A propeller shaft is located in and extends axially through the gearcase housing cavity, and a propeller is supported on the propeller shaft and adjacent the rearward end of the elongated cavity. Means are also provided for rotatably supporting the propeller shaft inside the gearcase housing and including a hollow bearing carrier member which is in encircling relation with the propeller shaft. The bearing carrier member is supported from the interior wall of the gearcase housing and carries a bearing rotatably engaging the propeller shaft. The bearing carrier member includes a radially extending member engageable with the interior wall, the radially extending member including a forward surface transverse to the longitudinal axis and generally coplanar with the surface portion of the shoulder. Means are also provided for anchoring the bearing carrier member to the interior wall of the gearcase housing, the means for anchoring including an anchoring means having a first portion engageable with the surface portion of the shoulder, and means for forcing the second portion of the anchoring member toward the forward surface of the radially extending member and for causing engagement of the first portion against the surface portion of the shoulder.

The invention also provides a lower unit for a marine propulsion device comprising a drive shaft housing having a lower end, a gearcase housing connected to the lower end of the drive shaft housing and having an interior wall defining an elongated cavity, the elongated cavity having a forward end and a rearward end. The interior wall includes a first surface transverse to the longitudinal axis of the elongated cavity and a second surface transverse to the longitudinal axis, the second surface being spaced circumferentially from the first surface and the first and second surfaces facing forwardly. A propeller shaft is located in the elongated cavity and extends axially through the elongated cavity, and a propeller is supported on the propeller shaft. Means are also provided for rotatably supporting the propeller shaft in the gearcase housing, this means including a hollow bearing carrier member which is in encircling relation with the propeller shaft. The bearing carrier member is supported by the interior wall of the gearcase housing and carries a bearing rotatably engaging the propeller shaft, the bearing carrier member including a forward end. Means are further provided for anchoring the bearing carrier member to the interior wall of the gearcase housing, the means for anchoring including a rigid ring insertable into the elongated cavity, at least a portion of the ring having a diameter less than the inside diameter of the elongated cavity, a first anchoring member extending outwardly from one portion of the ring, and a second anchoring member extending outwardly from a second portion of the ring. One anchoring member is positionable against the first surface, and the second anchoring member is positionable against the second surface. Means are further included for forcing the anchoring members against the surfaces and for forcing the bearing carrier member toward the ring.

Various other features and advantages of the invention will be apparent by reference to the following description, to the claims, and to the drawings.

BRIEF DESCRIPTION OF THE DRAWINGS

FIG. 1 is a partial cross section elevation view of a lower unit of a marine propulsion device embodying the invention.

FIG. 2 is an enlarged view taken along line 2—2 in FIG. 1.

FIG. 3 is an enlarged view similar to FIG. 1 but showing an alternative embodiment of the invention.

FIG. 4 is a view similar to FIG. 3 but showing another alternative embodiment of the invention.

FIG. 5 is a cross section view taken along line 4—4 in FIG. 4.

FIG. 6 shows an anchoring member inserted into a recess.

Before describing a preferred embodiment in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a lower unit 10 of a marine propulsion device, such as an outboard motor or a stern drive unit. Lower unit 10 is supported from a boat (not shown) in a usual manner for vertical tilting and for steering. The lower unit 10 has a gearcase housing 12 connected to the lower end of a drive shaft housing 14, the gearcase housing 12 having an interior wall 16 defining an elongated, generally cylindrical cavity 18.

Rotatably supported within the gearcase housing 12 is a propeller shaft 20 for driving a propeller 22 (shown fragmentarily) carried on the rear or aft end of the propeller shaft 20.

The propeller shaft 20 extends axially in the gearcase cavity 18 and is rotatably supported therein, in part, by a thrust bearing 24 and by a needle bearing 26, the thrust bearing 24 and the needle bearing 26 being supported by a bearing carrier member 28. The bearing carrier member has a hollow or spool-like construction and generally encircles the propeller shaft 20. The bearing carrier member 28 includes a generally cylindrical central sleeve portion 32, a forward portion 34 connected to the forward end of the sleeve portion 32 and adapted to carry the thrust bearing 38, and a spider section 40 connected to the rear or aft end of the sleeve portion 32. The forward portion 34 includes radially outwardly extending circumferentially spaced legs 42 which include outer ends fitting snugly against the interior wall 16 of the gearcase housing. In the particular embodiment of the invention illustrated in FIG. 1, the radially extending legs 42 also include forward faces 44 adapted to abut a shoulder 46 of the gearcase housing. The spider section 40 also includes a plurality of circumferentially spaced, radially extending legs 50 which at their outer ends rest against the interior wall 16 of the gearcase housing.

To prevent axial displacement of the propeller shaft relative to the gearcase housing, means are provided for anchoring the bearing carrier 28 in the gearcase housing 12. Referring to the particular embodiment of the invention illustrated in FIGS. 1, 2 and 6 the anchoring means includes a plurality of anchoring members 54 which are adapted to fit into internal recesses 56 or slots provided in the interior wall 16 of the gearcase housing 12. The recesses or slots are located in a rearward portion of the interior wall 16 of the gearcase housing and closely adjacent the propeller 22. The recesses 56 are provided in circumferentially spaced relation around the cavity 18 and each includes a rearward surface 58 generally perpendicular to the longitudinal axis of the propeller shaft 20. In the embodiment illustrated in FIGS. 1, 2 and 6 the anchoring members 54 comprise small generally rectangular flat metal plates each having a thickness, in the direction of the longitudinal axis of the propeller shaft, which is less than the width of the recesses 56 such that at least the radially outer ends of the anchoring members 54 can be easily slidably inserted into the recesses 56. The opposite ends or radially inwardly extending ends of the anchoring members 54 are provided with slots 60 illustrated in FIG. 2.

Means are further provided for forcing the radially inner ends of the anchoring members 54 against the rearward surfaces 62 of the radially outwardly extending legs 50 of bearing carrier member 28 once the anchoring members 54 have been inserted into the recesses 56. In the embodiment of the invention illustrated in FIGS. 1 and 2, such means for forcing includes a plurality of bolts 64 adapted to extend through the slots 60 provided in the radially inner ends of the anchoring members 54, the bolts 64 being threaded into threaded axially extending bores 68 in the rear faces of the radially outwardly extending legs 50 of the bearing carrier 28.

The assembly of the bearing carrier and the gearcase is accomplished by slidably inserting the bearing carrier 28, which in turn carries the propeller shaft 20, into the central bore 18 in the gearcase 12 until the shoulders 44 of the bearing carrier 28 abut the shoulder 46 of the interior wall of the gearcase 12. The anchoring members 54 are then slideably inserted into the recesses 56 in the gearcase housing such that they are positioned in the manner shown in phantom in FIG. 6. In one embodiment of the invention the outer periphery of the rearward portions of legs 50 can include a bevelled surface 70 (FIG. 6) to facilitate insertion of the anchoring members 54 into the recesses 56. Bolts 64 are inserted through the slots 60 in the radially inner ends of the anchoring members 54 and are threaded into the bores 68 in the bearing carrier 28. As the bolts 64 are tightened the anchoring members 54 will pivot on the fulcrum formed by the bevelled surfaces 70, and the radially outer ends of the anchoring members 54 will be forced rearwardly against the surfaces of the gearcase. As each of the anchoring members 54 is forced from the position shown in phantom in FIG. 6 to the position shown in the solid lines, the force of each such anchoring member on the bevelled surface 70 will also cause the bearing carrier 28 to be forced forwardly against the shoulder 46 of the gearcase 12.

Another embodiment of the invention is illustrated in FIG. 3. In the arrangement shown there, the gearcase 12 includes a shoulder 80 surrounding the rearward portion of the bearing carrier 28, and the circumferentially spaced radially extending legs 50 each include a forward face 82 adapted to be in generally planar alignment with the shoulder 80 of the gearcase 12. The legs 50 of the bearing carrier 28 also include shoulders 84 adapted to abut a second shoulder 86 of the gearcase 12.

In the embodiment illustrated in FIG. 3, the means for anchoring the bearing carrier 28 in the gearcase 12 includes a plurality of anchoring members 88 similar in size and shape to the anchoring members 54 shown in FIGS. 1 and 2. The radially outer ends of the anchoring members 88 are adapted to be positioned against the shoulders 80 of the gearcase, and means are also provided for forcing the radially inner ends of the anchoring members 88 against the forward faces 82 of the radially extending legs 50 of the bearing carrier and to cause the anchoring members 88 to be forced against the shoulders 80, thereby causing the bearing carrier 28 to be pulled forwardly. In the illustrated construction, this means includes bolts 64 which extend through bores 90 in the radially extending legs 50 and which are threadably received in threaded bores 92 in the anchoring members 88.

It should be noted that in the embodiment of the invention shown in FIG. 3, the forward faces 82 of the radially extending legs 50 slope somewhat radially outwardly and rearwardly such that there is a gap between the rearward face 94 of the anchoring members 88 and the radially outer portion of the forward face 82 of the radially extending legs 50. Accordingly, as the bolts 64 are tightened and the radially outer ends of the anchoring members engage the surface 80, the bolts 64 can be tightened sufficiently so that the shoulders 84 will firmly engage the complementary shoulders 86 of the gearcase.

During assembly of the bearing carrier 28 and the gearcase 12, and after the bearing carrier 28 has been inserted into the cylindrical cavity 18 of the gearcase 12, the anchoring members 88 can be located forwardly of the radially extending legs 50 by inserting them through the openings between the circumferentially spaced legs 50.

Another embodiment of the invention is illustrated in FIGS. 4 and 5. In that embodiment, the anchoring means is located adjacent the forward end of the bearing carrier 28 rather than at the rearward end as in the embodiments in FIGS. 1 and 3. In the embodiment shown in FIGS. 4 and 5, the cavity 18 of the gearcase includes a shoulder 100 at its forward end, and the forward end of the bearing carrier includes a complementary outwardly extending ring 102 engageable against the shoulder 100.

Means are further provided for pulling the bearing carrier 28 against the shoulder 100 of the gearcase such that the bearing carrier is anchored. The means for anchoring the bearing carrier includes, in part, an anchoring member or retainer ring 104 adapted to be housed in the central cavity 18 in the gearcase 12. The anchoring member or retainer ring 104 is illustrated in FIGS. 4 and 5 as comprising a rigid generally elliptical plate having a circular central bore 106 adapted to house a propeller shaft (not shown). As shown in FIG. 5, rigid retainer ring 104 has a dimension between its side walls 108 and 110 which is less than the diameter of the elongated cavity 18 in the gearcase. The retainer ring further includes a pair of radially outwardly extending anchoring tabs or anchoring members 112 and 114 integral with the ring 104 and which are adapted to be positioned respectively against a shoulder 116 of an upper portion of the gearcase cavity 18 and a rearward surface 118 of a slot or recess 120 cut in the bottom wall of the gearcase.

During assembly of the bearing carrier 28 and the gearcase 12, prior to insertion of the bearing carrier 28, the retainer ring 104 can be inserted into the cavity 18 by positioning the retainer with the anchoring member 112 extending forwardly and with the other anchoring member 114 extending rearwardly. Since the dimension between sidewalls 108 and 110 is less than the diameter of the cavity 18, the retainer ring can be easily inserted into the cavity. The ring 104 is then rotated or pivoted toward a plane transverse to the propeller axis until the anchoring member 114 is slidably inserted into the recess 120 as shown in phantom in FIG. 4, and the retainer ring is then further pivoted to the transverse plane shown in solid lines in FIG. 4.

Means are further provided for pulling the retainer ring 104 against the shoulder 116 of the gearcase and against the rearward shoulder 118 of the recess 120 and for forcing the bearing carrier 28 forwardly until it firmly abuts shoulder 100. In the illustrated arrangement this means comprises a plurality of bolts 122 which extend through elongated bores 124 in the radially extending legs 126 of the bearing carrier 28, the legs 126 extending radially outwardly from the forward end of the bearing carrier, and the forward ends of the bolts 122 being threadably received in threaded bores 128 in the retainer ring. As the bolts 122 are tightened, the retainer ring 104 will be pulled against the shoulders 116 and 118 of the gearcase, and the bearing carrier 28 will be pulled forwardly toward the retainer ring 104 until the bearing carrier 28 abuts the shoulder 100 of the gearcase 12.

Various features of the invention are set forth in the following claims.

I claim:

1. A lower unit for a marine propulsion device comprising a drive shaft housing having a lower end, a gearcase housing connected to said lower end of said drive shaft housing and having an interior wall defining an elongated cavity having a longitudinal axis, said interior wall including a shoulder extending transversely to said longitudinally axis, a first surface portion located in longitudinally spaced relation to said shoulder and transverse to said longitudinal axis of said elongated cavity, and a second surface portion located in longitudinally spaced relation to said shoulder and transverse to said longitudinal axis and spaced circumferentially from said first surface portion, a propeller shaft located in and extending axially through said gearcase housing cavity, a propeller supported on said propeller shaft, means for rotatably supporting said propeller shaft inside said gearcase housing and including a hollow bearing carrier member which is in encircling relation with said propeller shaft, said bearing carrier member being supported by said interior wall of said gearcase housing in abutting engagement with said shoulder and carrying a bearing rotatably engaging said propeller shaft, and means for anchoring said bearing carrier member to said gearcase housing and in said butting engagement with said shoulder, said means for anchoring including a pair of anchoring members, one of said anchoring members being engageable with said first surface portion, and the other of said anchoring members being engageable with said second surface portion, and means on said bearing carrier member and on said one anchoring member for forcing said one anchoring member toward said bearing carrier member and causing engagement of said one anchoring member against said first surface portion and said abutting engagement of said carrier with said shoulder, and means on said bearing carrier member and on said other anchoring member for forcing said other anchoring member toward said bearing carrier member and causing engagement of said other anchoring member against said second surface portion and said abutting engagement of said carrier with said shoulder.

2. A lower unit as set forth in claim 1 wherein said gearcase housing includes a rearward portion, and wherein said propeller is supported on said propeller shaft adjacent said rearward portion, and wherein said surface portions are located in said gearcase housing rearward portion adjacent said propeller.

3. A lower unit as set forth in claim 1 wherein said first anchoring member includes a bore therethrough, and wherein said means for forcing includes a bolt extending through said bore in said first anchoring member and being threadably housed in a bore in said bearing carrier member.

4. A lower unit for a marine propulsion device comprising a drive shaft housing having a lower end, a gearcase housing connected to said lower end of said drive shaft housing and having an interior wall defining an elongated cavity having a longitudinal axis, said interior wall including a recess having a surface portion perpendicular to said longitudinal axis of said elongated cavity, a propeller shaft located in and extending axially through said gearcase housing cavity, a propeller supported on said propeller shaft, means for rotatably supporting said propeller shaft inside said gearcase housing and including a hollow bearing carrier member which is in encircling relation with said propeller shaft, which is supported from said interior wall of said gearcase housing, and which carries a bearing rotatably engaging said propeller shaft, and means for anchoring said bearing carrier member to said gearcase housing, said means for anchoring including an anchoring member having a first portion which can be slideably inserted into said recess and means for forcing a second portion of said anchoring member toward said bearing carrier member and for causing engagement of said first portion against said surface portion.

5. A lower unit as set forth in claim 4 wherein said anchoring member is positioned at an oblique angle with respect to said longitudinal axis when said first portion is slideably inserted into said recess and wherein said anchoring member is pivoted to a position perpendicular to said longitudinal axis when said second portion is forced toward said bearing carrier.

6. A lower unit as set forth in claim 4 wherein said gearcase housing includes a rearward portion, and wherein said propeller is supported on said propeller shaft adjacent said rearward portion, and wherein said recess is located in said rearward portion adjacent said propeller.

7. A lower unit as set forth in claim 4 wherein said anchoring element includes a bore therethrough and wherein said means for forcing includes a bolt extending through said anchoring element and threadably housed in a bore in said bearing carrier member.

8. The lower unit as set forth in claim 4 wherein said bearing carrier member includes a rear face facing said propeller, and wherein said interior wall includes a pair of recesses on opposite sides of said cavity, and wherein said means for anchoring includes a pair of rigid anchoring members, one of said anchoring members having an end slidably insertable into one of said recesses and another of said anchoring members having an end slidably insertable into another of said recesses, and wherein said means for forcing includes a first bolt for forcing one of said anchoring members against said rear face of said bearing carrier member and a second bolt for forcing said another of said anchoring members against said rear face of said bearing carrier member.

9. A lower unit as set forth in claim 8 wherein at least one of said anchoring members includes a bore therethrough and wherein said rear face of said bearing carrier member includes a threaded bore, and wherein said means for forcing a second portion of said one of said anchoring members toward said bearing carrier member includes a bolt extending through said bore in said at least one of said anchoring members and being threadably housed in said threaded bore in said bearing carrier member.

10. A lower unit for a marine propulsion device comprising a drive shaft housing having a lower end, a gearcase housing connected to said lower end of said drive shaft housing and having an interior wall defining an elongated cavity having a longitudinal axis, said interior wall including a shoulder extending transversely to said longitudinally axis, a first surface portion located in longitudinally spaced relation to said shoulder and transverse to said longitudinal axis of said elongated cavity, and a second surface portion located in longitudinally spaced relation to said shoulder and transverse to said longitudinal axis and spaced circumferentially from said first surface portion, a propeller shaft located in and extending axially through said gearcase housing cavity, a propeller supported on said propeller shaft, means for rotatably supporting said propeller shaft inside said gearcase housing and including a hollow bearing carrier member supported by said interior wall of said gearcase housing in abutting engagement with said shoulder and carrying a bearing rotatably supporting said propeller shaft, and means for anchoring said bearing carrier member to said gearcase housing and in said abutting engagement with said shoulder, said means for anchoring including a pair of anchors, one of said anchors being engageable with said first surface portion, and the other of said anchors being engageable with said second surface portion, and means on said bearing carrier and on said one anchor for forcing said one anchor toward said bearing carrier member and causing engagement of said one anchor against said first surface portion and said abutting engagement of said carrier with said shoulder, and means on said bearing carrier and on said other anchor for forcing said other anchor toward said bearing carrier member and causing engagement of said other anchor against said second surface portion and said abutting engagement of said carrier with said shoulder.

11. A lower unit for a marine propulsion device comprising a drive shaft housing having a lower end, a gearcase housing connected to said lower end of said drive shaft housing and having an interior wall defining an elongated cavity having a longitudinal axis, said interior wall including a shoulder extending transversely to said longitudinally axis and a surface portion located in longitudinally spaced relation to said shoulder and transverse to said longitudinal axis of said elongated cavity, a propeller shaft located in and extending axially through said gearcase housing cavity, a propeller supported on said propeller shaft, means for rotatably supporting said propeller shaft inside said gearcase housing and including a hollow bearing carrier member supported by said interior wall of said gearcase housing in abutting engagement with said shoulder and carrying a bearing rotatably supporting said propeller shaft, and means for anchoring said bearing carrier member to said gearcase housing and in said abutting engagement with said shoulder and including an anchoring member engageable with said surface portion, and means on said bearing carrier member and on said anchoring member for forcing said anchoring member toward said bearing carrier member and causing engagement of said anchoring member against said surface portion and said abutting engagement of said carrier with said shoulder.

* * * * *